US012314546B2

(12) United States Patent
Chen et al.

(10) Patent No.: US 12,314,546 B2
(45) Date of Patent: May 27, 2025

(54) SCREEN CONTROL METHODS, DEVICES AND STORAGE MEDIA

(71) Applicant: SHENZHEN TCL NEW TECHNOLOGY CO., LTD., Guangdong (CN)

(72) Inventors: Yixin Chen, Guangdong (CN); Renli Xie, Guangdong (CN)

(73) Assignee: SHENZHEN TCL NEW TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/575,440

(22) PCT Filed: Apr. 15, 2022

(86) PCT No.: PCT/CN2022/087024
§ 371 (c)(1),
(2) Date: Dec. 29, 2023

(87) PCT Pub. No.: WO2023/273517
PCT Pub. Date: Jan. 5, 2023

(65) Prior Publication Data
US 2024/0329813 A1 Oct. 3, 2024

(30) Foreign Application Priority Data
Jul. 2, 2021 (CN) .......................... 202110753080.8

(51) Int. Cl.
G06F 3/0484 (2022.01)
(52) U.S. Cl.
CPC .................................. G06F 3/0484 (2013.01)
(58) Field of Classification Search
CPC ..................................................... G06F 3/0484

USPC ......................................................... 345/173
See application file for complete search history.

(56) References Cited

U.S. PATENT DOCUMENTS

2016/0109954 A1* 4/2016 Harris .................... G06V 20/20
345/156
2018/0246563 A1* 8/2018 Kunitomo ........... G06F 3/04842

FOREIGN PATENT DOCUMENTS

| CN | 103258372 A | 8/2013 |
| CN | 103607658 A | 2/2014 |
| CN | 104885047 A | 9/2015 |
| CN | 108170277 A | 6/2018 |

(Continued)

OTHER PUBLICATIONS

International Search Report in International application No. PCT/CN2022/087024, mailed on Jul. 11, 2022.

(Continued)

*Primary Examiner* — Mark Edwards
(74) *Attorney, Agent, or Firm* — PV IP PC; Wei Te Chung

(57) ABSTRACT

A screen control method, a device, a storage medium, and a terminal device. The method includes: recognizing a user's operation intend; generating preset identifications on a display terminal based on the operation intent and an identification generation rule; obtaining a target image; extracting the preset identifications in the target image, and executing operation instructions on the display terminal. The embodiments of the present invention can enable a display screen without a touch screen to have the effect that the display screen may be interacted with without the aid of physical buttons.

17 Claims, 4 Drawing Sheets

(56) References Cited

FOREIGN PATENT DOCUMENTS

CN         112347918 A      2/2021
JP          2003203232 A   *  7/2003

OTHER PUBLICATIONS

Written Opinion of the International Search Authority in International application No. PCT/CN2022/087024, mailed on Jul. 11, 2022.

* cited by examiner

SCREEN CONTROL METHODS, DEVICES AND STORAGE MEDIA

This application is a US national phase application based upon an International Application No. PCT/CN2022/087024, filed on Apr. 15, 2022, and this application claims priority of Chinese patent application No. 2021107530808 filed on Jul. 2, 2021 and titled 'SCREEN CONTROL METHODS, DEVICES, STORAGE MEDIA AND TERMINAL DEVICES'. The disclosure of the above applications are incorporated herein by reference in their entireties.

TECHNICAL FIELD

The present disclosure relates to screen control technologies, in particular to screen control methods, devices and storage media.

BACKGROUND

At present, most of the market available means for interaction with televisions are divided into interaction via remote control and interaction via touch control, in which the interaction with televisions through touch control is widely used, and the user's experience has been significantly improved by touch control. But at present, touch screens are necessary for most of the televisions to have the effect of touch control on the market, and alternatively, additional detection devices may be attached around the screens to achieve the corresponding effect.

However, all of the mentioned implementations require significant additional hardware costs and high manufacturing process requirements. Even if the cost is acceptable, it will not be widely used due to manufacturing processes, especially for screens with mainstream 65/75 inch or larger sizes, which produces very high costs, and seriously affects the performance of its appearance.

SUMMARY

One or more embodiments of the present application provide a screen control method including:
  recognizing a user's operation intent based on a current display content of a display terminal;
  generating a preset identification on each of subregions pre-divided on a current screen of the display terminal, respectively, based on the operation intent and a preset identification generation rule;
  obtaining a target image containing a subregion selected by the user; and
  extracting a preset identification corresponding to the subregion in the target image, and executing, based on the preset identification, an operation instruction corresponding to the preset identification on the display terminal.

In the screen control method described in one or more embodiments of the present application, the identification generation rule includes:
  obtaining, based on an intent category of the operation intent, a location distribution strategy corresponding to the intent category from a pre-created table of mapping relationships between the intent categories and the location distribution strategies.

In the screen control method described in one or more embodiments of the present application, after obtaining the location distribution strategy corresponding to the intent category from a pre-created table of mapping relationships between the intent categories and the location distribution strategies, the identification generation rule further includes:
  calculating composition strategy designations corresponding to different subregions based on screen purities and APL values of the different subregions;
  obtaining, based on each of the composition strategy designations, a composition strategy including a preset identification category which corresponds to the composition strategy designation from a pre-created table of mapping relationships between the composition strategy designations and the composition strategies; and
  constructing preset identifications corresponding to the different subregions based on the composition strategies.

In the screen control method described in one or more embodiments of the present application, the identification generation rule further includes:
  calculating screen clarities of the preset identifications on the different subregions respectively based on a preset display optimization rule; and
  adjusting, based on the screen clarities, clarities of the preset identifications corresponding to the different subregions.

In the screen control method described in one or more embodiments of the present application, an algorithm of the clarities refers to:

$$F2(APL) = a + b*(APL/255)^{2.2},$$

F2 refers to a screen clarity, APL refers to an average signal level, a=0.3 and b=0.7.

In the screen control method described in one or more embodiments of the present application, obtaining the target image containing the subregion selected by the user includes:
  obtaining the target image captured and uploaded by a photography terminal, the target image includes a blocked subregion on the display terminal and the preset identification corresponding to the blocked subregion.

In the screen control method described in one or more embodiments of the present application, the photography terminal is provided with a control configured so that when the control is triggered, the photography terminal acquires an original image of the current screen of the display terminal, assigns a mark to the original image as the target image, and filters the original image without the mark.

Accordingly, another aspect of one or more embodiments of the present application also provides a screen control device including:
  a recognition module for recognizing a user's operation intent based on a current display content of a display terminal;
  a generation module for generating a preset identification on each of subregions pre-divided on a current screen of the display terminal, respectively, based on the operation intent and a preset identification generation rule;
  an obtaining module for obtaining a target image containing a subregion selected by the user; and
  an execution module for extracting a preset identification corresponding to the subregion in the target image, and executing, based on the preset identification, an operation instruction corresponding to the preset identification on the display terminal.

Accordingly, another aspect of one or more embodiments of the present application also provides a storage medium storing a plurality of instructions adapted to be loaded by a processor loading the instructions to perform the screen control method as described above.

Beneficial Effect

One or more embodiments of the present application provide a screen control method, a device, a storage medium, and a terminal device. The method recognizes a user's operation intent based on a current display content of a display terminal; generates a preset identification on each of subregions pre-divided on a current screen of the display terminal, respectively, based on the operation intent and a preset identification generation rule; obtains a target image containing the subregion selected by the user; extracts a preset identification corresponding to the subregion in the target image, and executes an operation instruction corresponding to the preset identification on the display terminal based on the preset identification. One or more embodiments of the present application enable an ordinary display screen without a touch screen to also achieve the effect that the display screen may be interacted with without the aid of physical buttons, in particular, it can be used in a large-size display screen to reduce the cost of manufacturing the display screen as well as to simplify the processing, and its appearance can be more concise and more popular among users.

DETAILED DESCRIPTION

Some embodiments of the present application will be described in detail below in conjunction with the accompanying drawings. Obviously, the described embodiments are only a part of embodiments of the present application, and not all of the embodiments. Based on the embodiments in the present application, all other embodiments obtained by a person skilled in the art without making creative labor fall within the scope of protection of the present application.

One or more embodiments of the present application provide a screen control method that may be applied in a terminal device. The terminal device may be a device such as a smartphone, a tablet computer, and the like. Specifically, the screen control method according to one or more embodiments of the present application enables ordinary terminal devices without touch screens to also achieve the function that the terminal devices may be interacted with without physical controls, which means that, generally, it is not necessary to rely on remote controls or other physical buttons to realize such functions as text input or control of APPs, etc. Especially for screens with mainstream 65/75 inch or larger sizes, it is possible to reduce the cost of manufacturing the display screens as well as simplify the processing, and their appearance can be more concise.

Figure 1:
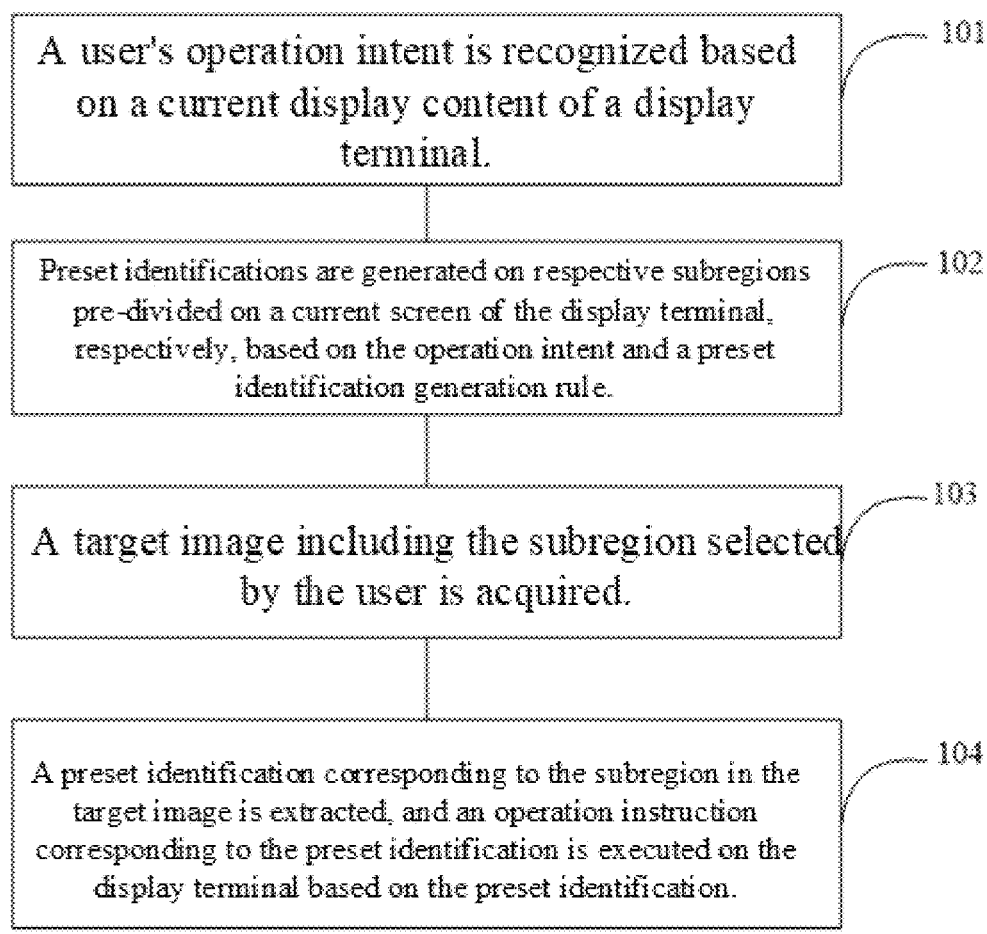
FIG. 1 is a flow chart of a screen control method according to one or more embodiments of the present application.

Referring to FIG. 1, FIG. 1 is a flow chart of a screen control method according to one or more embodiments of the present application. The screen control method is applied in a terminal device, and the method may include the following steps.

In step S101, a user's operation intent is recognized based on a current display content of a display terminal.

In one or more embodiments, when a user needs to interact through the terminal device realized by the screen control method according to one or more embodiments of the present application, the terminal device first recognizes the user's operation intent based on the current display content of the display terminal (e.g., an LCD display). Specifically, the sub-thread currently running in the terminal device can be found out through the underlying thread, and the application currently operated by the user can be identified in combination with the current display screen of the display terminal. For example, when the sub-thread currently running in the terminal device is 'music player search box', and the current display screen is 'virtual keyboard', it can be judged that the user's operation intent is to input text in the music player search box through the virtual keyboard.

In one or more embodiments, the operation intent may also be to draw in a drawing APP.

In step S102, preset identifications are generated on respective subregions pre-divided on a current screen of the display terminal, respectively, based on the operation intent and a preset identification generation rule.

In one or more embodiments, after the user's operation intent is recognized by the terminal device, preset identifications are generated on the respective subregions pre-divided on the current screen of the display terminal, respectively, based on the preset identification generation rule.

The identification generation rule includes:

obtaining, based on an intent category of the operation intent, a location distribution strategy corresponding to the intent category from a pre-created table of mapping relationships between intent categories and location distribution strategies, where the location distribution strategy includes preset identification categories corresponding to the respective subregions and subregion division rules.

Figure 2:
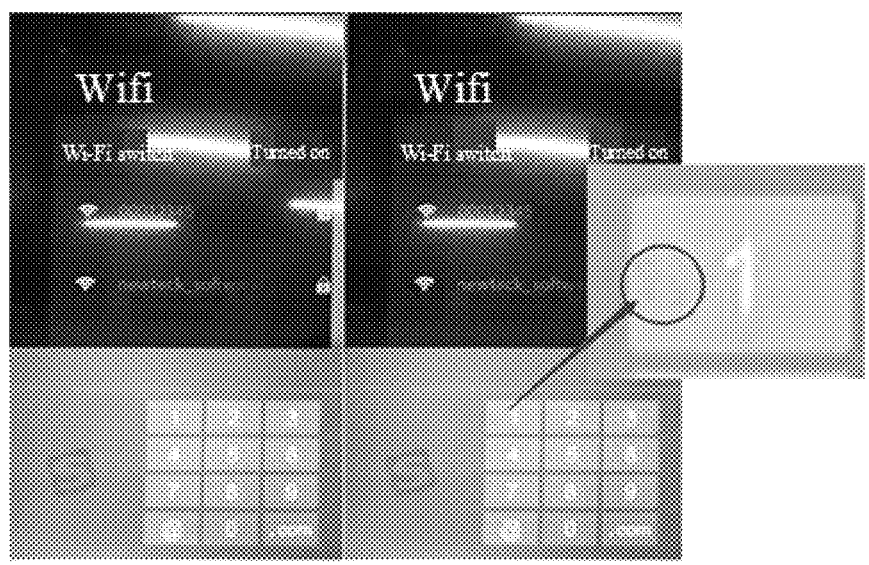
FIG. 2 is a schematic diagram of a specific display implementation of a screen control method according to one or more embodiments of the present application.

It should be noted that the table of mapping relationships between the intent categories of the operation intents and the location distribution strategies can be understood as a one-to-one correspondence between the intent categories of the various operation intents and the specified location distribution strategies. When a intent category of the operation intent of a certain user is acquired, the location distribution strategy of the preset identification corresponding thereto can be obtained by looking up the table. For example, assuming that the intent category corresponding to the operation intent is text input, the location distribution strategy corresponding to the intent category, i.e., the subregion division rule is to divide each key on the virtual keyboard, and the corresponding category of the preset identification on each subregion is text input. Continuing to take the text input as an example, the preset identification of the intent category may include the location coordinates of the subregion in which the preset identification is located, as well as the key information (e.g., numbers or letters) corresponding to the subregion. Referring to FIG. 2, the left side of FIG. 2 is a picture showing a conventional interface without a preset identification, and the right side of FIG. 2 is a picture showing an interface with a preset identification.

In one or more embodiments, the identification generation rule further includes:
calculating composition strategy designations corresponding to different subregions based on screen purities and APL values of the different subregions;
obtaining, based on each of the composition strategy designations, a composition strategy corresponding to the composition strategy designation from a pre-created table of mapping relationships between the composition strategy designations and the composition strategies, where the composition strategy includes a preset identification category;
constructing preset identifications corresponding to the different subregions based on the composition strategies.

Figure 3:
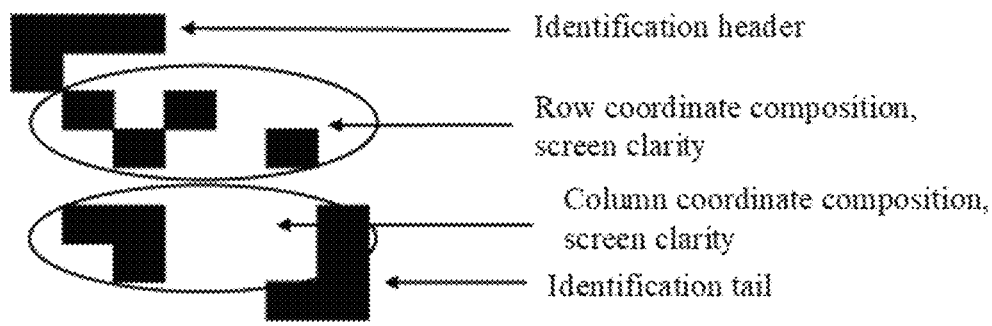
FIG. 3 is a schematic diagram of a composition strategy of a preset identification in a screen control method according to one or more embodiments of the present application.

In one or more embodiments, composition strategies are used to construct the preset identifications on different subregions, and the composition strategies include preset identification categories and other information. As shown in FIG. 3, which is a schematic diagram of a composition strategy of a preset identification, the preset identification category information is recorded in the identification header and identification tail.

The process of calculating the composition strategy designation is as follows.

$$F1 = a1*APL/255 + a2*P/255 + a3*\left(\left((APL+P)/2\right)/255\right)^{\wedge}2.2.$$

Where F1 refers to the composition strategy designation;
APL refers to the average signal level, taking an 8-bit signal as an example, the signal distribution is from 0 to 255, i.e., firstly, the number of signals SN(i) corresponding to a signal i of each grayscale is obtained, and then, APL=(SN(0)*0+SN(1)*1+ . . . +SN(255)*255)/(SN(0)+SN(1)+ . . . +SN(255));
P refers to the screen purity, taking an 8-bit signal as an example, the initial value of P is 0;
If the corresponding SN(i)>5%*(SN(0)+SN(1)+ . . . +SN(255)), then P+1; i increases from 0 to 255, and so on; and a1=0.3, a2=0.2, a3=0.5.

In one or more embodiments, the identification generation rule further includes:
calculating screen clarities of the preset identifications on the different subregions respectively based on a preset display optimization rule;
adjusting, based on the screen clarities, clarities of the preset identifications corresponding to the different subregions.

In one or more embodiments, due to the different display terminals with different screen pixel levels and different display effects, the degree of brightness and darkness of the background screen displayed by different APPs is also different, and if the display effect of the preset identifications is not adjusted according to the different situations, it will affect the user's sense of viewing or the acquisition effect of photography terminals. In order to ensure that the preset identifications do not affect the sense of viewing when they are displayed on the screen, they need to be faded as much as possible or even not be recognized by naked eyes, but at the same time, it is necessary to meet the requirement that the information contained in the preset identifications can be captured in the target image captured by the photography terminals. Therefore, it is necessary to adjust the screen clarities of the preset identifications on different subregions by means of a preset display optimization rule to satisfy that the preset identifications will not affect the sense of viewing when they are displayed on the screen, and at the same time, the information contained in the preset identifications can be captured in the target image captured by the photography terminals.

The display optimization rule includes:
calculating an average picture level (APL) value corresponding to the subregion in which the preset identification is to be generated;
calculating the screen clarity of the preset identification on the corresponding subregion using a predetermined clarity algorithm based on the calculated APL value.
The clarity algorithm is as follows.

$$F2(APL) = a + b*(APL/255)^{\wedge}2.2.$$

Where F2 refers to a screen clarity, a=0.3 and b=0.7.
In step S103, a target image including the subregion selected by the user is acquired.

In one or more embodiments, the terminal device acquires the target image captured and uploaded by an photography terminal.

It should be explained that the photography terminal refers to a device having a photography function and a data transmission function, which is not limited herein. The target image includes a blocked subregion on the display terminal and a preset identification corresponding to the blocked subregion. In a specific application scenario, when a user carries out an operation, such as text input, on the current display terminal of the terminal device, the photography terminal shoots a target image that currently contains the text input operation of the user. Assuming that the target image shows that a certain subregion is blocked by the user's finger, the preset identification corresponding to the selected subregion is obtained, and the corresponding operation is performed according to the information contained in the selected preset identification.

Further, in order to enable the photography terminal to effectively acquire the preset identification on the subregion, a plurality of identical preset identifications may also be provided in each subregion to ensure that the photography terminal can capture the preset identification.

Further, a control may be provided on the photography terminal, which is configured so that when the control is triggered, the photography terminal acquires an original image of the current screen of the display terminal, assigns a mark to the original image as the target image, and filters the original image without the mark.

Since the user may not have determined the selection of a subregion by staying in the subregion, in order to prevent the photography terminal from using the image acquired in such a case as the target image and thereby causing a misjudgment, in one or more embodiments, the photography terminal may be set as a handheld photography terminal, so that the user holds the device while operating on the display terminal, covers the subregion with fingers when determining a certain subregion, and presses a control on the photography terminal to determine the subregion, at this time, the photography terminal acquires an original image of the current screen of the display terminal and marks the original image as a target image, and filters the original image without the mark, i.e., only the marked original image is uploaded to the terminal device for the next step of the preset identification extraction operation.

In step S104, a preset identification corresponding to the subregion in the target image is extracted, and an operation instruction corresponding to the preset identification is executed on the display terminal based on the preset identification.

In one or more embodiments, a preset identification corresponding to the subregion in the target image is extracted, and an operation instruction corresponding to the preset identification is executed on the display terminal based on the preset identification. In cases where the category corresponding to the preset identification is text input, the operation instruction corresponding thereto inputs the numbers or texts on the subregion corresponding to the preset identification into the search box, i.e., a touch screen-like operation effect and real-time interaction with the terminal device are realized.

The preset identification corresponding to the subregion in the target image can be extracted by a halcon algorithm, specifically, the halcon algorithm includes the following steps.

In step 1, a feature region of a target image is framed, and the feature region is cropped to obtain a first image.

In step 2, a grayscale conversion is performed on the first image to obtain a second image, and a conversion between rgb to gray is completed.

In step 3, a noise processing is performed on the feature region of the second image, and a third image is obtained by using fuzzy or filtering algorithms to process the image noises and clutters.

In step 4, a feature edge of the feature region in the third image is extracted by using a threshold.

In step 5, the feature region is selected by using a connected region as well as area information to obtain the preset identification in the target image.

All of the above optional technical solutions can be used in any combination to form optional embodiments of the present invention, which will not be repeated herein.

In specific implementations, the present invention is not limited by the order of execution of the various steps described, and certain steps may also be carried out in other orders or at the same time without generating conflicts.

As described above, the screen control method provided by one or more embodiments of the present application recognizes a user's operation intent based on a current display content of a display terminal; generates a preset identification on the respective subregions pre-divided on a current screen of the display terminal, respectively, based on the operation intent and a preset identification generation rule; obtains a target image containing the subregion selected by the user; extracts the preset identification corresponding to the subregion in the target image, and executes an operation instruction corresponding to the preset identification on the display terminal based on the preset identification. One or more embodiments of the present application enable an ordinary display screen without a touch screen to also achieve the effect that the display screen may be interacted with without the aid of physical buttons, in particular, it can be used in screens with mainstream 65/75 inch or larger sizes to reduce the cost of manufacturing the display screen as well as to simplify the processing, and its appearance can be more concise.

One or more embodiments of the present application also provide a screen control device that can be integrated in a terminal device. The terminal device may be a device such as a smartphone, a tablet computer and the like.

Figure 4:
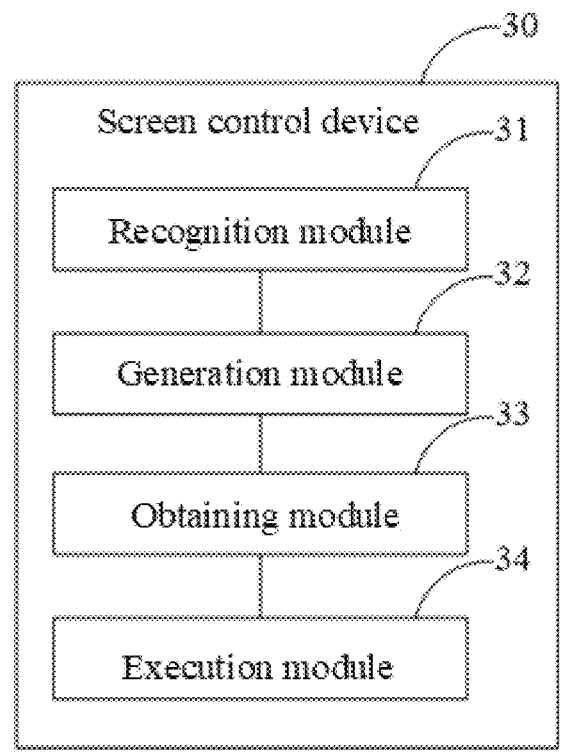
FIG. 4 is a schematic structural diagram of a screen control device according to one or more embodiments of the present application.

Referring to FIG. 4, FIG. 4 is a schematic structural diagram of a screen control device according to one or more embodiments of the present application. The screen control device 30 may include:

- a recognition module 31 for recognizing a user's operation intent based on a current display content of a display terminal;
- a generation module 32 for generating preset identifications on respective subregions pre-divided on a current screen of the display terminal, respectively, based on the operation intent and a preset identification generation rule;
- an obtaining module 33 for acquiring a target image containing a subregion selected by the user;
- an execution module 34 for extracting a preset identification corresponding to the subregion in the target image, and executing, based on the preset identification, an operation instruction corresponding to the preset identification on the display terminal.

In one or more embodiments, the identification generation rule further includes:

- calculating composition strategy designations corresponding to different subregions based on screen purities and APL values of the different subregions;
- obtaining, based on each of the composition strategy designations, a composition strategy corresponding to the composition strategy designation from a pre-created table of mapping relationships between the composition strategy, designations and the composition strategies where the composition strategy includes a preset identification category;
- constructing preset identifications corresponding to the different subregions based on the composition strategies.

In one or more embodiments, the obtaining module 33 is used to obtain the target image captured and uploaded by a photography terminal, the target image includes a blocked subregion on the display terminal and the preset identification corresponding to the blocked subregion.

In one or more embodiments, the photography terminal is provided with a control configured so that when the control is triggered, the photography terminal acquires an original image of the current screen of the display terminal, assigns a mark to the original image as the target image, and filters the original image without the mark.

In one or more embodiments, each of the subregions contains one or more identical preset identifications.

In specific implementations, each of the above modules may be realized as an independent entity, or may be combined in any combination and realized as one same entity or several entities.

As described above, the screen control device 30 provided by one or more embodiments of the present application recognizes a user's operation intent based on a current display content of a display terminal by the recognition module 31; generates preset identifications on respective subregions pre-divided on a current screen of the display terminal, respectively, based on the operation intent and a preset identification generation rule by the generation module 32; obtains a target image containing a subregion selected by the user by the obtaining module 33; extracts a preset identification corresponding to the subregion in the target image, and executes an operation instruction corresponding to the preset identification on the display terminal based on the preset identification by the execution module 34.

Figure 5:
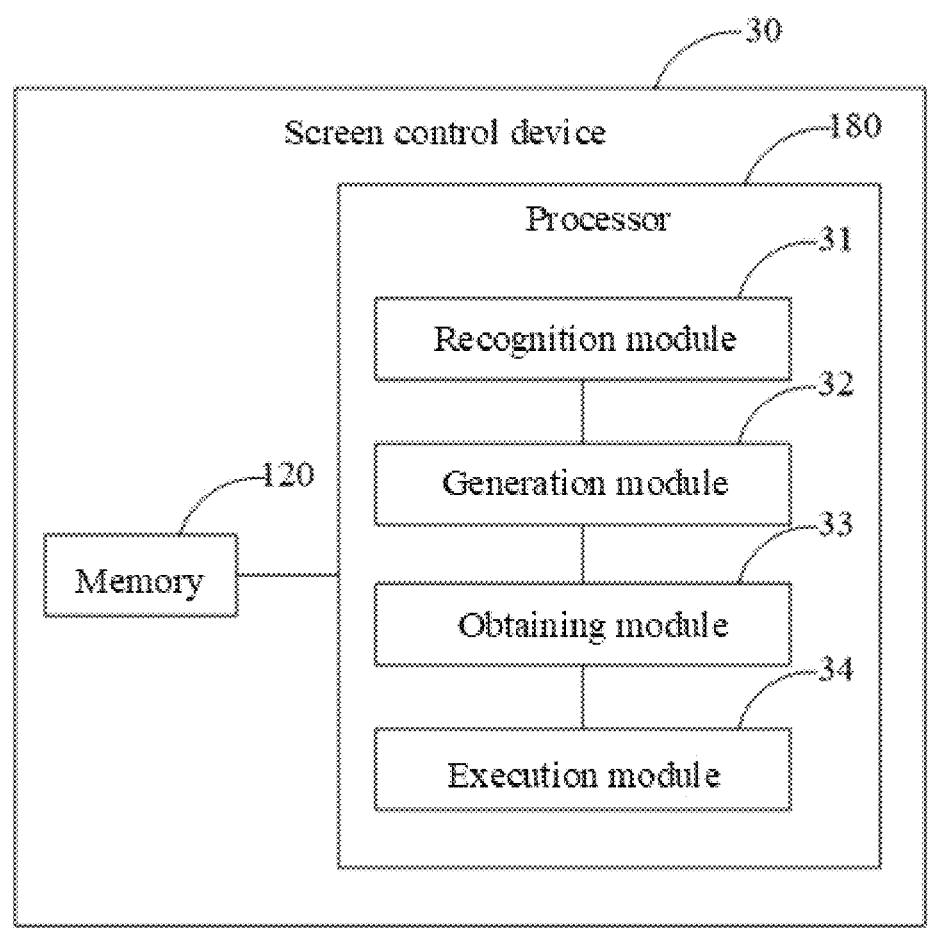
FIG. 5 is another schematic structural diagram of a screen control device according to one or more embodiments of the present application.

Referring to FIG. 5, which is another schematic structural diagram of a screen control device according to one or more embodiments of the present application, the screen control device 30 includes a memory 120, one or more processors 180, and one or more applications stored in the memory 120 and configured to be executed by the processor 180; the processor 180 may include a recognition module 31, a generation module 32, an obtaining module 33, and an execution module 34. For example, the above components may be structured and connected as follows.

The memory 120 may be used to store application programs and data. The application programs stored in the memory 120 contain executable code. The application programs may constitute various functional modules. The processor 180 executes various functional applications as well as data processing by running the application programs stored in the memory 120. In addition, the memory 120 may include a high-speed random access memory as well as a non-volatile memory, such as at least one disk memory device, a flash memory device, or other volatile solid state memory devices. Accordingly, the memory 120 may also include a memory controller to provide access to the memory 120 by the processor 180.

The processor 180 is the control center of the device, utilizing various interfaces and wiring to connect various portions of the entire terminal, and performs various functions and processes data of the device by running or executing applications stored in the memory 120, as well as calling up data stored in the memory 120, thus the device can be monitored as a whole. Optionally, the processor 180 may include one or more processing cores; preferably, the processor 180 may integrate an application processor and a modem processor, where the application processor mainly handles operating systems, user interfaces, application programs, and the like.

Specifically, in one or more embodiments, the processor 180 loads executable code corresponding to the processes of one or more applications into the memory 120 in accordance with the following modules' instructions, and the processor 180 runs the application programs stored in the memory 120 so as to realize various functions.

The recognition module 31 for recognizing a user's operation intent based on a current display content of a display terminal;
the generation module 32 for generating preset identifications on respective subregions pre-divided on the current screen of the display terminal, respectively, based on the operation intent and a preset identification generation rule;
the obtaining module 33 for acquiring a target image containing a subregion selected by the user;
the execution module 34 for extracting a preset identification corresponding to the subregion in the target image, and executing an operation instruction corresponding to the preset identification on the display terminal based on the preset identification.

In one or more embodiments, the identification generation rule further includes:
calculating composition strategy designations corresponding to different subregions based on screen purities and APL values of the different subregions;
obtaining, based on the composition strategy designation, a composition strategy corresponding to a composition strategy designation from a pre-created table of mapping relationships between the composition strategy designation and the composition strategy, where the composition strategy includes a preset identification category;
constructing preset identifications corresponding to the different subregions based on the composition strategy.

In one or more embodiments, the obtaining module 33 is used to obtain the target image captured and uploaded by a photography terminal, the target image includes a blocked subregion on the display terminal and the preset identification corresponding to the blocked subregion.

In one or more embodiments, the photography terminal is provided with a control configured so that when the control is triggered, the photography terminal acquires an original image of the current screen of the display terminal, assigns a mark to the original image as the target image, and filters the original image without the mark.

In one or more embodiments, each of the subregions contains one or more identical preset identifications.

One or more embodiments of the present application also provide a screen control device that can be a device such as a smartphone, a tablet computer and the like.

Figure 6:
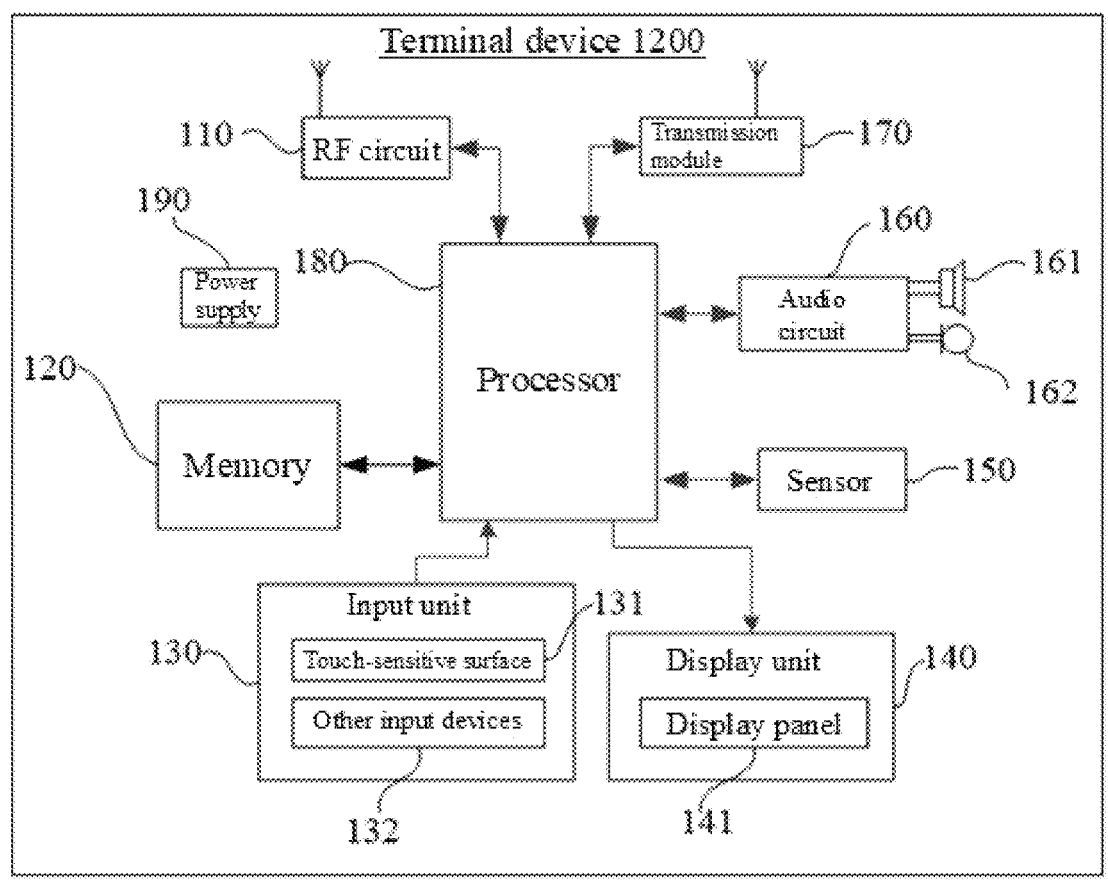
FIG. 6 is a schematic structural diagram of a terminal device according to one or more embodiments of the present application.

Referring to FIG. 6, which is a schematic structural diagram of a terminal device according to one or more embodiments of the present application, the terminal device 1200 may be used to implement the vibration adjustment method provided in the above embodiments and may be a smartphone or a tablet computer.

As shown in FIG. 6, the terminal device 1200 may include an RF (Radio Frequency) circuit 110, a memory 120 including one or more (only one is shown in the figure) computer-readable storage media, an input unit 130, a display unit 140, a sensor 150, an audio circuit 160, a transmission module 170, a processor 180 including one or more (only one is shown in the figure) processing cores, a power supply 190, and the like. It could be understood by those skilled in the art that the structure of the terminal device 1200 illustrated in FIG. 6 does not constitute a limitation upon the terminal device 1200, and may include more or fewer components, or combinations of certain components, or different arrangements of components than what is shown in the figure.

The RF circuit 110 is used to receive as well as transmit electromagnetic waves, and to realize the interconversion of electromagnetic waves and electrical signals, so as to communicate with a communication network or other devices. The RF circuit 110 may include a variety of existing circuit elements for performing these functions, such as antennas, RF transceivers, digital signal processors, encryption/decryption chips, subscriber identity module (SIM) cards, memories, and the like. The RF circuit 110 may communicate with various networks such as the Internet, corporate intranets, wireless networks, or with other devices via wireless networks.

The memory 120 may be used to store software programs and modules, such as the program instructions/modules corresponding to the vibration adjustment method in the above embodiments, the processor 180 executes various functional applications and data processing by running the software programs and modules stored in the memory 120, and automatically select a vibration reminder mode for screen control according to the current scene in which the terminal device is located, which ensures that scenes such as meetings are not disturbed and the user can perceive incoming calls, thus the intelligence of the terminal device can be enhanced. The memory 120 may include a high-speed random memory as well as a non-volatile memory, such as one or more magnetic storage devices, a flash memory, or other non-volatile solid state memories. In one or more embodiments, the memory 120 may further include memories remotely located with respect to the processor 180, and the remote memories may be connected to the terminal device 1200 via a network. Embodiments of the networks described above include, but are not limited to, the Internet, an enterprise intranet, a local area network, a cellular communication network, and combinations thereof.

The input unit 130 may be used to receive incoming numeric or character information, as well as to generate keyboard, mouse, joystick, optical, or trackball signal inputs related to user settings and function control. Specifically, the input unit 130 may include a touch-sensitive surface 131 as well as other input devices 132. The touch-sensitive surface 131, also referred to as a touch display or touchpad, may collect touch operations by a user on or near it (e.g., operations on or near the touch-sensitive surface 131 by a user using a finger, a stylus, or any other suitable objects or accessories) and drive the corresponding connecting device according to a predetermined program. Optionally, the touch-sensitive surface 131 may include a touch detection device and a touch controller. The touch detection device detects the touch orientation of the user and detects signals from the touch operation, and transmits the signals to the touch controller. The touch controller receives the touch information from the touch detection device and converts it into the contact coordinates, and then sends it to the processor 180, and is capable of receiving and executing the commands from the processor 180. In addition, the touch-sensitive surface 131 can be realized to adopt various types such as a resistive type, a capacitive type, an infrared type, and a surface acoustic wave type, etc. In addition to the touch-sensitive surface 131, the input unit 130 can include other input devices 132. Specifically, the other input devices 132 may include, but are not limited to, one or more of a physical keyboard, a function key (e.g., a volume control key, an on/off key, etc.), a trackball, a mouse, a joystick, and the like.

The display unit 140 may be used to display information input by or provided to the user and various graphical user interfaces of the terminal device 1200, which may include graphics, texts, icons, videos, and any combination thereof. The display unit 140 may include a display panel 141, optionally, the display panel 141 may be configured in the form of an LCD (Liquid Crystal Display), an OLED (Organic Light-Emitting Diode), or the like. Further, the touch-sensitive surface 131 may cover the display panel 141, and when the touch-sensitive surface 131 detects a touch operation on or near it, it transmits the touch operation to the processor 180 to determine the type of touch event, and subsequently the processor 180 provides a corresponding visual output on the display panel 141 based on the type of the touch event. Although in FIG. 6, the touch-sensitive surface 131 and the display panel 141 are implemented as two separate components for the input and output functions, in some embodiments, the touch-sensitive surface 131 may be integrated with the display panel 141 to implement the input and output functions.

The terminal device 1200 may also include at least one sensor 150, such as a light sensor, a motion sensor, and other sensors. Specifically, the light sensor may include an ambient light sensor and a proximity sensor, where the ambient light sensor may adjust the brightness of the display panel 141 according to the brightness of the ambient light, and the proximity sensor may turn off the display panel 141 and/or the backlight when the terminal device 1200 moves to ears. As a type of motion sensor, a gravity acceleration sensor may detect the magnitude of acceleration in each direction (generally three axes) and the magnitude and direction of gravity in a stationary state, which may be used for applications for recognizing cell phone postures (e.g., horizontal and vertical screen switches, related games, magnetometer postures calibrations), vibration recognition related functions (e.g., pedometer, tapping), and the like. Other sensors such as gyroscopes, barometers, hygrometers, thermometers, infrared sensors, etc., which the terminal device 1200 may also be configured with are not described herein.

The audio circuit 160, a speaker 161, and a microphone 162 may provide an audio interface between the user and the terminal device 1200. The audio circuit 160 may transmit converted electrical signals from the received audio data to the speaker 161, which are converted by the speaker 161 into sound signals for output. On the other hand, the microphone 162 converts the collected sound signals into electrical signals, which are received by the audio circuit 160 and converted into audio data, then the audio data is output to the processor 180 for processing and passed through the RF circuit 110 in order to be sent to, for example, another terminal, or the audio data is output to the memory 120 for further processing. The audio circuit 160 may also include an earbud jack to provide communication between the peripheral headset and the terminal device 1200.

The terminal device 1200 can help a user send and receive e-mails, browse webs, access streaming media, etc., through the transmission module 170 (e.g., a Wi-Fi module), which provides the user with wireless broadband Internet access. Although the transmission module 170 is illustrated in FIG. 6, it could be understood that it is not a necessary constituent of the terminal device 1200, and may be omitted without changing the essence of the present invention as necessary.

The processor 180 is the control center of the terminal device 1200, utilizing various interfaces and wiring to connect various portions of the entire cell phone, and performs various functions and processes data of the terminal device 1200 by running or executing software programs and/or modules stored in the memory 120, and by calling up data stored in the memory 120, so as to monitor the cell phone as a whole. Optionally, the processor 180 may include one or more processing cores; in one or more embodiments, the processor 180 may integrate an application processor and a modem processor, where the application processor mainly handles operating systems, user interfaces, application programs, etc., while the modem processor mainly handles wireless communication. It could be understood that the modem processor described above may also not be integrated into the processor 180.

The terminal device 1200 also includes the power supply 190 (e.g., a battery) that powers the various components, and in one or more embodiments, the power supply may be logically connected to the processor 180 via a power management system so as to realize functions such as charging, discharging, and power consumption management via the power management system. The power supply 190 may also include one or more DC or AC power supplies, recharging systems, power failure detection circuits, power converters or inverters, power status indicators, and any other components.

Although not shown, the terminal device 1200 may also include a camera (e.g., front camera, rear camera), a Bluetooth module, and the like, which will not be described herein. Specifically, in one or more embodiments, the display unit 140 of the terminal device 1200 is a touch display, and the terminal device 1200 further includes a memory 120, and one or more programs stored in the memory 120, and it is configured that one or more processors 180 execute instructions contained in the one or more programs for performing the following operations:

recognizing a user's operation intent based on a current display content of a display terminal;

generating preset identifications on respective subregions pre-divided on a current screen of the display terminal, respectively, based on the operation intent and a preset identification generation rule;

acquiring a target image containing a subregion selected by the user;

extracting a preset identification corresponding to the subregion in the target image, and executing an operation instruction corresponding to the preset identification on the display terminal based on the preset identification.

In one or more embodiments, the identification generation rule further includes:

calculating composition strategy designations corresponding to different subregions based on screen purities and APL values of the different subregions;

obtaining, based on the composition strategy designation, a composition strategy corresponding to a composition strategy designation from a pre-created table of mapping relationships between the composition strategy designation and the composition strategy, where the composition strategy includes a preset identification category;

constructing preset identifications corresponding to the different subregions based on the composition strategy.

In one or more embodiments, the photography terminal is provided with a control configured so that when the control is triggered, the photography terminal acquires an original image of the current screen of the display terminal, assigns a mark to the original image as the target image, and filters the original image without the mark.

In one or more embodiments, each of the subregions contains one or more identical preset identifications.

One or more embodiments of the present application also provide a terminal device that may be a device such as a smartphone, a tablet computer and the like.

As described above, one or more embodiments of the present application provide a terminal device 1200 performing the steps of: recognizing a user's operation intent based on a current display content of a display terminal; generating preset identifications on the respective subregions pre-divided on a current screen of the display terminal, respectively, based on the operation intent and a preset identification generation rule; obtaining a target image containing a subregion selected by the user; extracting the preset identification corresponding to the subregion in the target image, and executing an operation instruction corresponding to the preset identification on the display terminal based on the preset identification. One or more embodiments of the present application enable an ordinary display screen without a touch screen to also achieve the effect that the display screen may be interacted with without the aid of physical buttons, in particular, it can be used in screens with mainstream 65/75 inch or larger sizes to reduce the cost of manufacturing the display screen as well as to simplify the processing, and its appearance can be more concise.

One or more embodiments of the present application also provide a storage medium storing a computer program, and when the computer program is run on a computer, the computer executes the screen control method described in any one of the above embodiments.

It should be noted that for the screen control method described in the present invention, an ordinary tester in the field may understand that all or part of the process of realizing the screen control method described in one or more embodiments of the present invention can be accomplished by controlling the relevant hardware by means of computer programs stored in a computer-readable storage medium, such as a memory of a terminal device, and executed by at least one processor in the terminal device, and the execution may include a process such as one or more embodiments of the vibration adjustment method described above. The storage medium may be a disk, a CD-ROM, a Read Only Memory (ROM), a Random Access Memory (RAM) and the like.

For the vibration adjustment device of one or more embodiments of the present invention, the functional modules thereof may be integrated in a single processing chip, or the individual modules may physically exist separately, or two or more modules may be integrated in a single module. The integrated modules can be realized either in the form of hardware or in the form of software function modules. The integrated module may also be stored in a computer-readable storage medium, such as a read-only memory, a disk or a CD-ROM, if it is implemented in the form of a software function module and sold or used as a separate product.

Some embodiments of the present application have been described in detail above. The description of the above embodiments merely aims to help to understand the present application. Many modifications or equivalent substitutions with respect to the embodiments may occur to those of ordinary skill in the art based on the present application. Thus, the contents of this specification should not be construed as a limitation of the present invention.

What is claimed is:

1. A screen control method, comprising:

recognizing a user's operation intent based on a current display content of a display terminal;

generating a preset identification on each of subregions pre-divided on a current screen of the display terminal, respectively, based on the operation intent and a preset identification generation rule;

obtaining a target image containing a subregion selected by the user; and extracting a preset identification corresponding to the subregion in the target image, and executing, based on the preset identification, an operation instruction corresponding to the preset identification on the display termina;

wherein the identification generation rule comprises:

obtaining, based on an intent category of the operation intent, a location distribution strategy corresponding to the intent category from a pre-created table of mapping relationships between the intent categories and the location distribution strategies;

wherein after obtaining the location distribution strategy corresponding to the intent category from the pre-created table of mapping relationships between the intent categories and the location distribution strategies, the identification generation rule further comprises:

calculating composition strategy designations corresponding to different subregions based on screen purities and APL values of the different subregions;

obtaining, based on each of the composition strategy designations, a composition strategy comprising a preset identification category which corresponds to the composition strategy designation from a pre-created table of mapping relationships between the composition strategy designations and the composition strategies; and constructing preset identifications corresponding to the different subregions based on the composition strategies.

2. The screen control method of claim 1, wherein the identification generation rule further comprises:

calculating screen clarities of the preset identifications on the different subregions respectively based on a preset display optimization rule; and adjusting, based on the screen clarities, clarities of the preset identifications corresponding to the different subregions.

3. The screen control method of claim 2, wherein an algorithm of the clarities refers to:

$$F2(APL) = a + b*(APL/255)^\wedge 2.2,$$

wherein, F2 refers to a screen clarity, APL refers to an average signal level, a=0.3 and b=0.7.

4. The screen control method of claim 1, wherein obtaining the target image containing the subregion selected by the user comprises:

obtaining the target image captured and uploaded by a photography terminal, the target image comprises a blocked subregion on the display terminal and the preset identification corresponding to the blocked subregion.

5. The screen control method of claim 4, wherein the photography terminal is provided with a control configured so that when the control is triggered, the photography terminal acquires an original image of the current screen of the display terminal, assigns a mark to the original image as the target image, and filters the original image without the mark.

6. The screen control method of claim 1, wherein each of the subregions contains one or more identical preset identifications.

7. A screen control device, comprising:

a recognition module for recognizing a user's operation intent based on a current display content of a display terminal;

a generation module for generating a preset identification on each of subregions pre-divided on a current screen of the display terminal, respectively, based on the operation intent and a preset identification generation rule;

an obtaining module for obtaining a target image containing a subregion selected by the user; and an execution module for extracting a preset identification corresponding to the subregion in the target image, and executing, based on the preset identification, an operation instruction corresponding to the preset identification on the display terminal;

wherein obtaining the target image containing the subregion selected by the user comprises:

obtaining the target image captured and uploaded by a photography terminal, the target image comprises a blocked subregion on the display terminal and the preset identification corresponding to the blocked subregion;

wherein the photography terminal is provided with a control configured so that when the control is triggered, the photography terminal acquires an original image of the current screen of the display terminal, assigns a mark to the original image as the target image, and filters the original image without the mark.

8. The screen control device of claim 7, wherein the identification generation rule comprises:

obtaining, based on an intent category of the operation intent, a location distribution strategy corresponding to the intent category from a pre-created table of mapping relationships between the intent categories and the location distribution strategies.

9. The screen control device of claim 8, wherein after obtaining the location distribution strategy corresponding to the intent category from the pre-created table of mapping relationships between the intent categories and the location distribution strategies, the identification generation rule further comprises:

calculating composition strategy designations corresponding to different subregions based on screen purities and APL values of the different subregions;

obtaining, based on each of the composition strategy designations, a composition strategy comprising a preset identification category which corresponds to the composition strategy designation from a pre-created table of mapping relationships between the composition strategy designations and the composition strategies; and constructing preset identifications corresponding to the different subregions based on the composition strategies.

10. The screen control device of claim 9, wherein the identification generation rule further comprises:

calculating screen clarities of the preset identifications on the different subregions respectively based on a preset display optimization rule; and adjusting, based on the screen clarities, clarities of the preset identifications corresponding to the different subregions.

11. The screen control device of claim 10, wherein an algorithm of the clarities refers to:

$$F2(APL) = a + b*(APL/255)^\wedge 2.2,$$

wherein, F2 refers to a screen clarity, APL refers to an average signal level, a=0.3 and b=0.7.

12. The screen control device of claim 7, wherein each of the subregions contains one or more identical preset identifications.

13. A screen control method, comprising:

recognizing a user's operation intent based on a current display content of a display terminal;

generating a preset identification on each of subregions pre-divided on a current screen of the display terminal, respectively, based on the operation intent and a preset identification generation rule;

obtaining a target image containing a subregion selected by the user; and extracting a preset identification corresponding to the subregion in the target image, and executing, based on the preset identification, an operation instruction corresponding to the preset identification on the display terminal;

wherein obtaining the target image containing the subregion selected by the user comprises:
obtaining the target image captured and uploaded by a photography terminal, the target image comprises a blocked subregion on the display terminal and the preset identification corresponding to the blocked subregion;
wherein the photography terminal is provided with a control configured so that when the control is triggered, the photography terminal acquires an original image of the current screen of the display terminal, assigns a mark to the original image as the target image, and filters the original image without the mark.

14. The screen control method of claim 13, wherein the identification generation rule comprises:
obtaining, based on an intent category of the operation intent, a location distribution strategy corresponding to the intent category from a pre-created table of mapping relationships between the intent categories and the location distribution strategies.

15. The screen control method of claim 13, wherein after obtaining the location distribution strategy corresponding to the intent category from the pre-created table of mapping relationships between the intent categories and the location distribution strategies, the identification generation rule further comprises:

calculating composition strategy designations corresponding to different subregions based on screen purities and APL values of the different subregions;
obtaining, based on each of the composition strategy designations, a composition strategy comprising a preset identification category which corresponds to the composition strategy designation from a pre-created table of mapping relationships between the composition strategy designations and the composition strategies; and
constructing preset identifications corresponding to the different subregions based on the composition strategies.

16. The screen control method of claim 13, wherein the identification generation rule further comprises:
calculating screen clarities of the preset identifications on the different subregions respectively based on a preset display optimization rule; and
adjusting, based on the screen clarities, clarities of the preset identifications corresponding to the different subregions.

17. The screen control method of claim 13, wherein each of the subregions contains one or more identical preset identifications.

* * * * *